US00RE36059E

United States Patent [19]

Thomas

[11] E Patent Number: Re. 36,059

[45] Reissued Date of Patent: Jan. 26, 1999

[54] ADJUSTABLE WINDOW MOUNTING VEHICLE ACCESSORY

[76] Inventor: Wyman R. Thomas, 5150 Evergreen Way, Riverside, Calif. 92507

[21] Appl. No.: 670,627

[22] Filed: Jun. 26, 1996

Related U.S. Patent Documents

Reissue of:

[64] Patent No.: 5,503,451
Issued: Apr. 2, 1996
Appl. No.: 315,936
Filed: Sep. 30, 1994

[51] Int. Cl.[6] ..... B60J 9/00

[52] U.S. Cl. ..... 296/153; 224/482; 224/901; 297/411.22

[58] Field of Search ..... 296/153; 224/482, 224/901; 297/411.2, 411.22; 248/118; 280/751

[56] References Cited

U.S. PATENT DOCUMENTS

| | | | |
|---|---|---|---|
| D. 200,547 | 3/1965 | MacKay . | |
| 1,329,487 | 2/1920 | West | 296/153 X |
| 1,426,787 | 8/1922 | Spencer . | |
| 1,873,414 | 8/1932 | Jarvis | 297/413 |
| 2,670,235 | 2/1954 | Susil | 296/153 |
| 2,877,049 | 3/1959 | Lucas | 296/153 |
| 3,145,848 | 8/1964 | Wood | 224/482 X |
| 3,151,649 | 10/1964 | Mitchell, Jr. | 224/42.46 R |
| 4,154,383 | 5/1979 | Honatzis . | |
| 4,418,733 | 12/1983 | Kallman | 224/901 X |
| 4,456,644 | 6/1984 | Janz et al. | 296/153 X |
| 4,512,504 | 4/1985 | Owlett | 224/42.46 R |
| 4,810,026 | 3/1989 | Doane | 296/153 |
| 4,863,134 | 9/1989 | Young et al. | 248/118 X |
| 4,865,237 | 9/1989 | Allen . | |
| 4,877,284 | 10/1989 | Doane | 296/153 |
| 4,890,878 | 1/1990 | Harary et al. | 296/153 |
| 4,950,023 | 8/1990 | Waller et al. | 296/153 |
| 4,953,765 | 9/1990 | Little et al. | 224/901 X |
| 5,004,292 | 4/1991 | Horne | 296/153 |
| 5,031,808 | 7/1991 | Dolenc | 224/482 |

FOREIGN PATENT DOCUMENTS

| | | | |
|---|---|---|---|
| 1016138 | 11/1952 | France | 296/153 |
| 1109991 | 2/1956 | France | 248/118 |
| 3742540 | 6/1989 | Germany | 224/42.45 R |

*Primary Examiner*—Dennis H. Pedder
*Attorney, Agent, or Firm*—Sheldon & Mak

[57] ABSTRACT

Disclosed is an adjustable vehicle arm rest support system structured around a pair of nylon straps which anchor to a vehicle window frame. First ends of the nylon straps are inserted in the window frame between the glass and window gasket. The nylon straps extend down the interior door wall adjacent to the driver or passenger. Attached to the straps is a rest pad for resting the arm and a fully adjustable elbow rest which may be raised, lowered, tilted or removed. Either of these pads can be used as a side wall impact pad for protecting the driver or passenger. Each of the pads and the pouch are continuously adjustable vertically and horizontally, and are also tiltable. Also disclosed is a beverage container support and a padded pouch that is adjustably mountable on the straps. The straps also support a beverage holder and a padded pouch, useful for storing coins, gloves, eye glasses and the like.

15 Claims, 4 Drawing Sheets

ADJUSTABLE WINDOW MOUNTING VEHICLE ACCESSORY

Matter enclosed in heavy brackets [ ] appears in the original patent but forms no part of this reissue specification; matter printed in italics indicates the additions made by reissue.

BACKGROUND

The present invention relates to motor vehicles and more particularly to an adjustable apparatus for use in the interior of a vehicle for providing comfort and support as an arm rest and for organizing and storing keys, coins, glasses, beverages, and the like.

Since the dawn of the automobile age approximately a century ago, manufacturers and inventors have attempted to make driving more comfortable. Of particular importance is seating comfort for the driver. Driving is by nature a stressful and fatiguing activity, and much effort has gone into relieving strain on the driver's back and arms. Various devices for resting the arms have been developed including the early Spencer arm rest of U.S. Pat. No. 1,426,787. This device was a simple shelf that attaches to an automobile's window frame. A later apparatus, U.S. Pat. No. 4,810,026, added a lower elbow rest with a side slot to the Spencer elbow rest. With the wide range of vehicles now in use and given the great physical differences between typical automobile users, an adjustable arm rested is needed that will accommodate a wide degree of adjustability.

On degree of adjustability which is not adequately addressed in the background art is the slanting or tilting of the lower arm or elbow rest to accommodate modern ergometric automobile design features.

For instance, in many late model cars, the front seats adjust so that the entire seat structure tilts forward or backward. This tilt is in part to allow for varying degrees of leg and lumbar back support. Tilting of the arm rest allows for a more natural symmetry of the arms relative to the rest of the body in such a seat placement. A second advantage of using a slanted elbow rest is for the flexibility it provides when used in conjunction with so-called tilt or adjustable steering wheels. Use of a slanted elbow rest for resting the arm is more comfortable when used in conjunction with steering wheels adjusted at acute angles relative to driver seating. A third advantage of using a slanted elbow rest is that the elbow can be easily adjusted to varying height positions along the same rest without having to make a physical adjustment to the structure assembly.

Thus there is a need for an adjustable window mounting vehicle accessory that overcomes the above disadvantages.

SUMMARY

The present invention meets this need by providing an adjustable window mounting vehicle accessory. In one aspect of the invention, an adjustable window mounting vehicle accessory includes a flexible support member having an anchor end and a free end; anchor means connected at the anchor end of the support member for releasably holding the support member proximate a vehicle window sill, the free end downwardly extending over an interior surface of the vehicle, the anchor means including a tab member forming a tab extremity of the support member, the anchor means having a cusp-shaped portion located proximate the support member and facing along the support member toward the free end thereof for hooking onto a resilient edge extremity of a vehicle member, the support member extending between the vehicle member and a window of the vehicle; and at least one accessory structure that is adjustably mountable to the support member.

The anchor means can form an end extremity of the flexible support member. The tab extremity can include a tab loop that is formed in the support member, the end extremity also being folded within the tab loop to form a cusp loop, the loops being secured by stitch means connecting layers of the flexible support member, the cusp-shaped portion being formed between the cusp loop and a portion of the flexible support member proximate the stitch means. The accessory can include a plurality of accessory structures, each of the accessory structures being supportively connectable at continuously vertically adjustable locations above the free end of the support member, and at continuously horizontally adjustable locations relative to at least one of the other accessory structures.

The accessory can include a pair of the support members, the support members each being connectable in spaced relation at horizontally adjustable locations relative to each of the accessory structures. At least some of the accessory structures have attached thereto one member of a hook-loop fastener, the support members each having a complementary member of the hook-loop fastener extending from proximate the anchor end to the free end and on a side thereof facing away from the interior surface of the vehicle, the complementary members on the support members being vertically and horizontally adjustably connectable to one member of some of the accessory structures.

The accessory structures can include a pad member. Preferably one of the pad members is supportable at continuously vertically and horizontally adjustable locations proximate the window sill for padding the window sill. Preferably one of the pad members is supportable at continuously vertically and horizontally adjustable locations below the window sill for providing a side-impact protective pad. The interior surface can have a ledge portion extending horizontally from below the window sill, one of the pad members being horizontally adjustably supportable on the ledge portion.

The accessory structures can include a storage pouch. The accessory structures can include a beverage container holder.

DRAWINGS

These and other features, aspects, and advantages of the present invention will become better understood with reference to the following description, appended claims, and accompanying drawings, where:

DESCRIPTION

Figure 1:
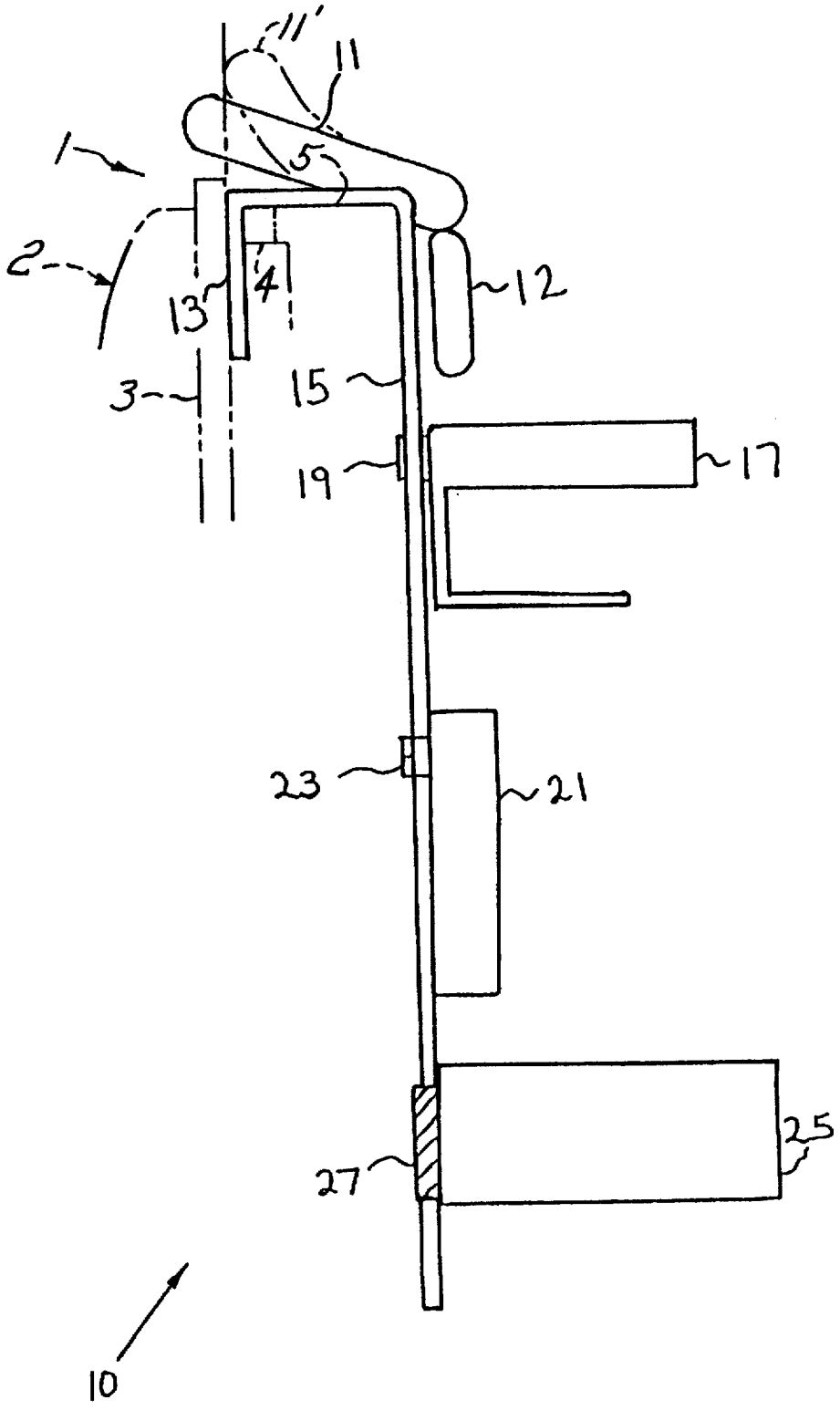
FIG. 1 is a side view of the vehicle arm support system according to the present invention.

The present invention is directed to an adjustable window mounting vehicle accessory. With reference to FIG. 1 of the drawings, a support system 10 is shown as it would be oriented while installed in the window frame 1 of a vehicle door 2. The preferred embodiment of the system 10 is constructed around a pair of parallel nylon straps 15, spaced approximately six inches apart. One end of the straps 15 act as anchors 13 and are wedged between window glass 3 and rubber weather stripping 4 of an automobile window. The support system 10 is designed to work equally well for either the driver or passenger side of the vehicle. Once the anchors 13 are inserted, the remaining length of the strap 15 and installed attachments are draped over a sill portion 5 the frame 1 and downwardly along an inside surface of the door 2, adjacent to the driver or passenger.

A window rest 11 is a pad of one to two inch thick foam rubber encased in soft vinyl, leather or other soft fabric, which is positioned on top of the window for resting the arm. When the window is closed, the window rest 11 can be folded slightly so that the outer most edge (adjacent to the anchors 13) turns up and presses against the closed window as indicated at 11'. The window rest 11 can be easily positioned forward or rearward by locating the position of the anchors 13 accordingly. Since the window rest 11 is made of soft material, it can be molded and shaped to conform to the shape of the door upon which it rests, and to adjust to the comfort and preferences of the user. In FIG. 1, the window rest 11 is shown tilted slightly toward the position of the user. The window rest 11 could also be positioned and molded to lie flat on the window frame.

Attached to the window rest 11 is a side wall flap 12. The side wall strap 12 extends down over the edge of the vehicle window frame to provide padding against passenger impact in the event of a collision to the side of the vehicle. The combination of the window rest 11 and the side wall flap 12 provide padding and protection to an area, which in most vehicles, is constructed of metal or very hard molded plastic.

Figure 2:
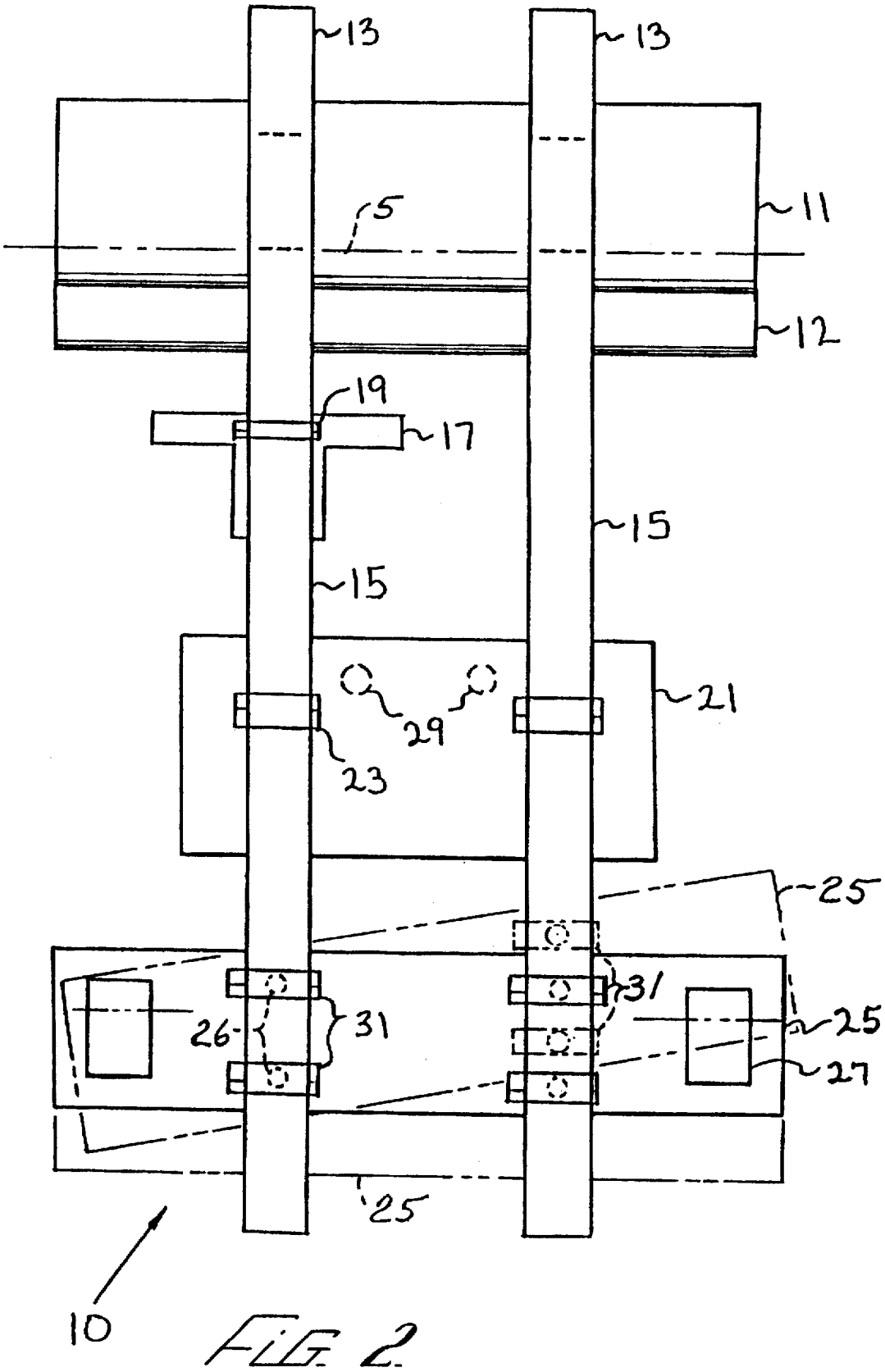
FIG. 2 is a rear view of the vehicle arm support system of FIG. 1.

Referring now to FIG. 2, a rear view of the system 10 is shown with the straps 15 fully extended. Below the side wall flap 12, on the left strap 15, is anchored a beverage support 17. The beverage support 17 is constructed of rubber or plasticized foam and is useful for supporting a beverage cup or soft drink can. The support 17 is attached to the strap 16 by a buckle 19 which allows the support 17 to be raised and lowered along the strap 15, transferred from the left strap 15 to the right strap 15, or removed completely from the system 10. Consistent with the objective of providing a safety surface for protecting the rider from injury caused by side vehicle impact, the beverage support 17 is designed of soft padded material and will collapse if empty or provide padding if it is holding a container at the time of impact.

A pouch 21 is shown in the figures positioned below the beverage support 17, and is used for holding coins, eyeglasses, tissues, gloves and the like. The pouch 21 is attached to the straps 15 by a pair of buckles 23 which permit the pouch 21 to be raised, lowered or removed from the straps 15. The pouch 21 has a pair of snaps 29 for sealing the pouch 21 to prevent its contents from falling out. The pouch 21 is constructed of soft vinyl or leather and is internally padded with foam rubber or a similar impact absorbing material.

Located below the pouch 21 on the system 10 shown in FIG. 2 is an elbow rest 25 which consists of a block of contoured foam rubber covered in soft vinyl or leather. The elbow rest 25 attaches to the straps 15 by four buckles 31 which permit adjustment of the rest along the straps. In the preferred embodiment of the present invention, the buckles 31 are attached to the elbow rest 25 using swivel connectors 26. The swivel connectors 26 allow the buckles 31 to rotate and thereby allow the elbow rest 25 to be adjusted so that the elbow rest is positioned at an angle relative to the descending straps 15. Explained in a different way, the pair of buckles 31 on the left strap 15 of FIG. 2 may be positioned higher or lower relative to the buckles 31 on the right strap 15. This uneven positioning of the buckles relative to the straps allows the elbow rest 25 to be adjusted in a tilted or slanted configuration. Attached to the back of the elbow rest 25 is a pair of supports 27 for attaching and fixing the elbow rest 25 against the door surface adjacent to the driver or passenger. The support 27 includes hook-loop type fastening material which permits easy removal for adjustment or detachment of the elbow rest 25, suitable material being commonly commercially available as Velcro® fasteners.

With further reference to FIGS. 3–6, a preferred alternative configuration of the system 10, designated vehicle arm support system 40, has a window pad 42, a side pad 44, and a pouch 46, the window pad 42, the side pad 44, and the pouch 46 each having a loop fastener patch 48, the patches 48 being respectively designated 48a, 48b, and 48c. The window pad 42, the side pad 44, and the pouch 46 are supportively connected to a pair of straps 50, the strap 50 having a hook fastener strip 52 on the side of the strap 50 facing the patches 48. The strap 50 includes a web 54 extending from the hook fastener strip 52 to an anchor portion 56 that is formed by folding and stitching the web 54 as described herein. In this configuration of the system 40, the pads 42 and 44 and the pouch 46 are each advantageously horizontally adjustable relative to the straps 50, and to each other. This is because the patches 48 extend horizontally between and beyond the straps 50.

Figure 5:
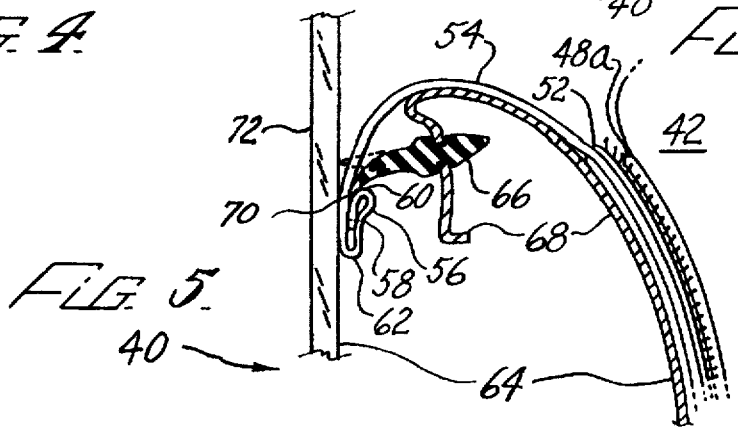
FIG. 5 is a detail side sectional elevational view showing a top portion of the vehicle arm support system of FIG. 3 connected to a vehicle door.

As best shown in FIG. 5, the anchor portion 56 has a seam 58 for maintaining a flattened loop at the free end of the web 54, a cusp 60, that faces toward the hook fastener strip 52 along the strap 50, being formed thereby. A tab portion 62 of the anchor portion 56 extends opposite the cusp, forming an end extremity of the strap 50. The anchor portion 56 conveniently attaches to a vehicle door 64 by hooking onto an elastomeric strip 66 that forms a part of the door 64, the strip 66 being fastened to an inside door member 68, and a side extremity 70 of the strip 66 being fastened to a movable window 72 of the door 64.

According to the present invention, the tab portion 62 is inserted between the window 72 and the elastomeric strip 66, the cusp 60 hooking around the side extremity 70 of the elastomeric strip 66, the side extremity 70 being deformed downwardly by the combination of downward movement of the anchor portion 56 and sideward pressure that is produced by the web 54 occupying space between the elastomeric strip 66 and the window 72.

As further shown in the drawings, the strap 50 can have a loop fastener strip 74 on the web 54 opposite the hook fastener strip 52 for permitting convenient foreshortening of each of the straps 50 when it is desired to omit one of the window pad 42, the side pad 44, or the pouch 46 or when the window pad 42, the side pad 44, and the pouch 46 are closely spaced near the top of the straps 50.

As shown in the drawings, an elastic tape member 76 can be threaded through a strap loop 78 on each strap 50 and a pad loop 80 on the window pad 42 for tethering the window pad 42 to the straps 50 to protect against loss of the window pad 42 if accidentally dislodged or dropped.

Figure 4:
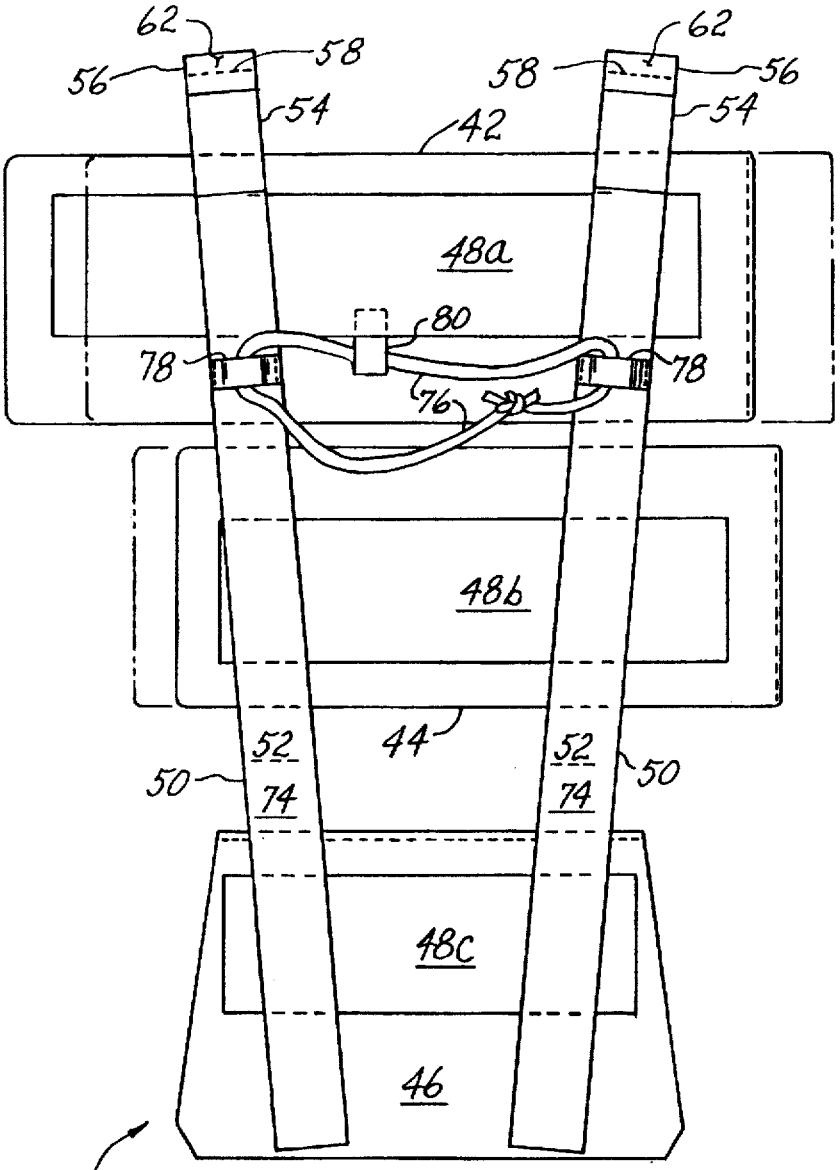
FIG. 4 is a rear view of the vehicle arm support system of FIG. 3.
Figure 3:
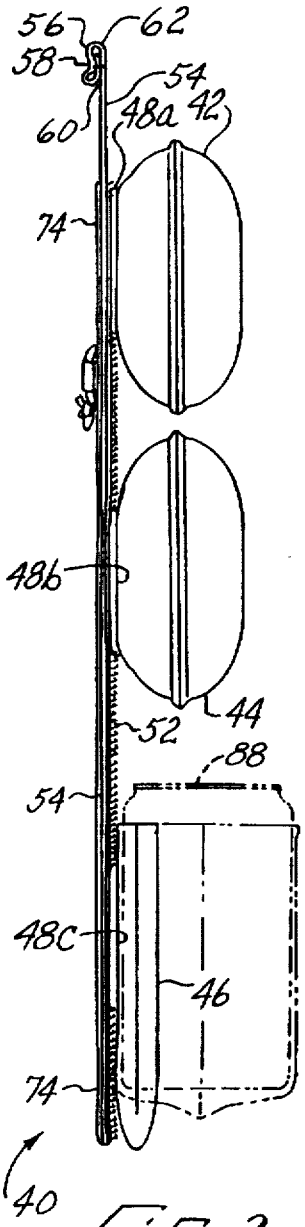
FIG. 3 is a side view showing an alternative configuration of the vehicle arm support system of FIG. 1.
Figure 6:
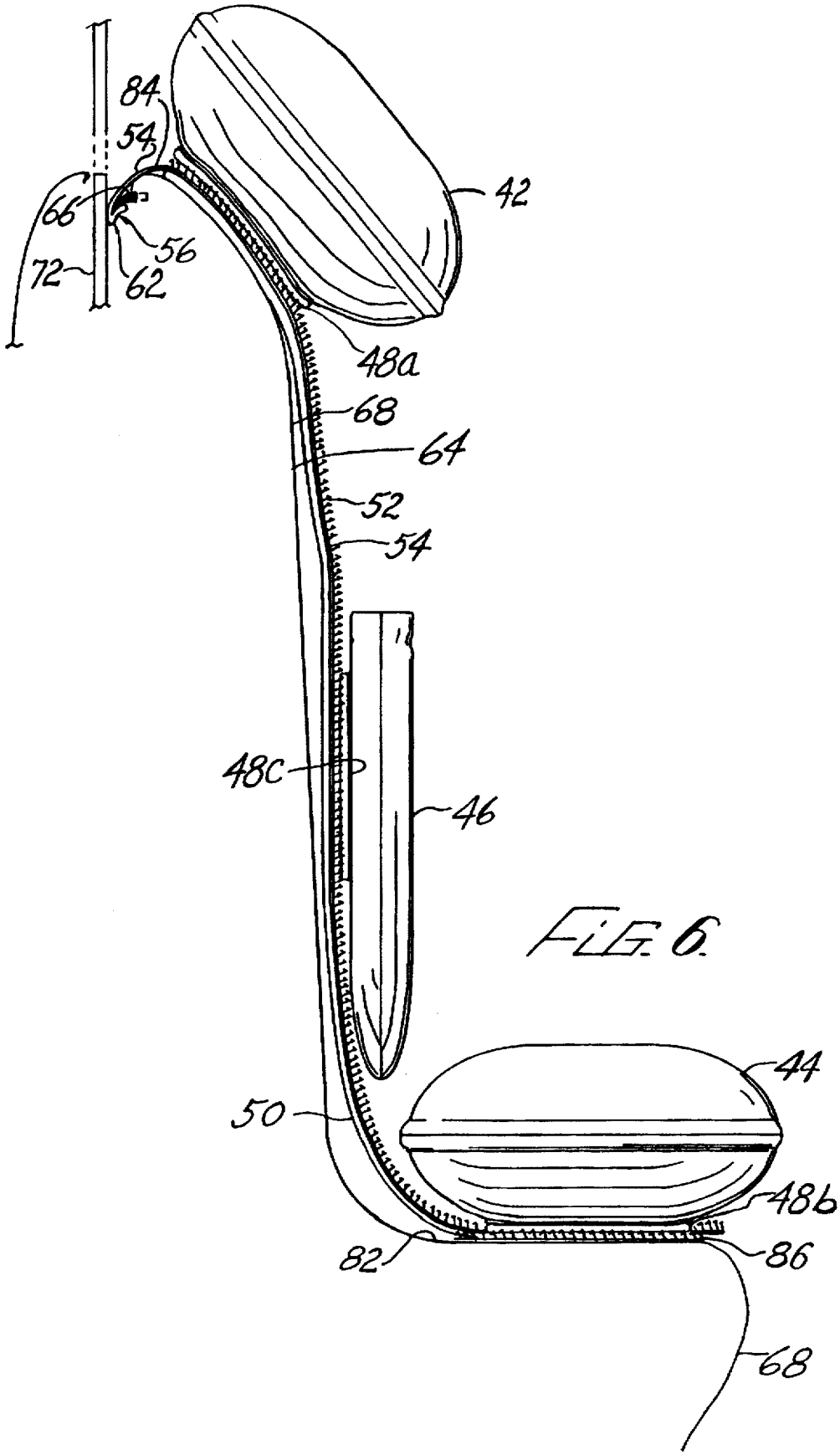
FIG. 6 is a side sectional elevational view of the vehicle arm support system of FIG. 3 connected to a vehicle door having an arm rest platform.

As further shown in FIG. 6, the support system 40 can be used with the door 64 having an arm rest ledge portion 82, with one of the pads 42 or 44 being supported thereon in a generally horizontal orientation. More particularly, the pouch 46 is relocated between the pads 42 and 44 on the straps 50, the pad 44 together with lower portions of the straps 50 resting on the ledge portion 82, the pad 44 serving as an arm rest pad. As also shown in FIG. 6, the pad 42 is positioned at a desired height proximate a sill portion 84 of the inside door member 68, each of the pads 42 and 44 as well as the pouch 46 being horizontally adjustable as shown in FIG. 4. Preferably a counterpart of the hook fastener strip 52, designated 86, is affixed to the inside door member 68 for holding the lower portions of the straps 50 and the pad 44 in a selected position on the door 64. In this use of the system 40, the loop fastener patch 48c of the pad 44 and the loop fastener strips 74 of the straps 50 function as counterparts of the supports 27 of the system 10 of FIGS. 1 and 2. The pouch 46 can conveniently hold a variety of articles. In particular, the pouch 46 can provide an insulated cavity for holding a beverage container 88 as indicated by dashed lines in FIG. 3.

The hook fastener strip [84] *86* is affixed to the inside door member 68 by a suitable adhesive, which can be an adhesive backing that is readily available on commercially supplied quantities of hook-loop fasteners such as Velcro®.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. An adjustable window mounting vehicle accessory comprising:

(a) a flexible support member having an anchor end and a free end;

(b) anchor means connected at the anchor end of the support member for releasably holding the support member proximate a vehicle window sill, the free end downwardly extending over an interior surface of the vehicle, the anchor means *forming an end extremity of the flexible support member and* comprising a tab member forming a tab extremity of the support member, the anchor means having a cusp-shaped portion, the cusp-shaped portion being located proximate the support member and facing along the support member toward the free end thereof for hooking onto a resilient edge extremity of a vehicle member, the support member extending between the vehicle member and a window of the vehicle, *tab extremity comprising a tab loop that is formed in the support member, the end extremity also being folded within the tab loop to form a cusp loop, the loops being secured by stitch means connecting layers of the flexible support member, the cusp-shaped portion being formed between the cusp loop and a portion of the flexible support member proximate the stitch means*; [and]

(c) at least one accessory structure[,]; *and*

(*d*) *a fastener element for mounting* the accessory structure [being adjustably mountable] to the support member.

[2. The accessory of claim 1, wherein the anchor means forms an end extremity of the flexible support member.]

[3. The accessory of claim 1, wherein the tab extremity comprises a tab loop that is formed in the support member, the end extremity also being folded within the tab loop to form a cusp loop, the loops being secured by stitch means connecting layers of the flexible support member, the cusp-shaped portion being formed between the cusp loop and a portion of the flexible support member proximate the stitch means.]

4. [The accessory of claim 1, further comprising] *An adjustable window mounting vehicle accessory comprising:*

(*a*) *a flexible support member having an anchor end and a free end;*

(*b*) *anchor means connected at the anchor end of the support member for releasably holding the support member proximate a vehicle window sill, the free end downwardly extending over an interior surface of the vehicle, the anchor means comprising a tab member forming a tab extremity of the support member, the anchor means having a cusp-shaped portion, the cusp-shaped portion being located proximate the support member and facing along the support member toward the free end thereof for hooking onto a resilient edge extremity of a vehicle member, the support member extending between the vehicle member and a window of the vehicle;*

(*c*) a plurality of accessory structures, each of the accessory structures [being supportively connectable] *having a fastener element for supportively connecting to the support member* at continuously vertically adjustable locations above the free end of the support member, and at continuously horizontally adjustable locations relative to at least one of the other accessory structures.

5. [The accessory of claim 1,] *An adjustable window mounting vehicle accessory* comprising:

(*a*) a pair of [the] *flexible* support members, *each support member having an anchor end and a free end;*

(*b*) *anchor means connected at the anchor end of the support member for releasably holding the support member proximate a vehicle window sill, the free end downwardly extending over an interior surface of the vehicle, the anchor means comprising a tab member forming a tab extremity of the support member, the anchor means having a cusp-shaped portion, the cusp-shaped portion being located proximate the support member and facing along the support member toward the free end thereof for hooking onto a resilient edge extremity of a vehicle member, the support member extending between the vehicle member and a window of the vehicle;*

(*c*) *at least one accessory structure; and*

(*d*) *a fastener element for connecting* the support members [each being connectable] in spaced relation at horizontally adjustable locations relative to [each of] the accessory [structures] *structure*.

6. The accessory of claim 5, wherein [at least some of] the accessory [structures have] *structure has the fastener element* attached thereto, *the fastener element being* one member of a hook-loop fastener, the support members each having a complementary member of the hook-loop fastener extending from proximate the anchor end to the free end and on a side thereof facing away from the interior surface of the vehicle, the complementary members on the support members being vertically and horizontally adjustably connectable to [one member of some of] the accessory [structures] *structure*.

7. The accessory of claim 1, wherein the accessory [structures include] *structure comprises* a pad member.

8. The accessory of claim 7, wherein [one of] the pad [members] *member* is supportable at continuously vertically and horizontally adjustable locations proximate the window sill for padding the window sill.

9. The accessory of claim 7, wherein [one of] the pad [members] *member* is supportable at continuously vertically and horizontally adjustable locations below the window sill for providing a side-impact protective pad.

10. The accessory of claim 7, wherein the interior surface has a ledge portion, the ledge portion extending horizontally from below the window sill and wherein [one of] *the fastener element is an adjustable fastener whereby* the pad [members] *member* is horizontally adjustably supportable on the ledge portion.

11. The accessory of claim 1, wherein the accessory [structures include] *structure comprises* a storage pouch.

12. The accessory of claim 1, wherein the accessory [structures include] *structure comprises* a beverage container holder.

13. An adjustable window mounting vehicle accessory comprising:

(a) a flexible support member having an anchor end and a free end;

(b) anchor means forming an end extremity of the support member for releasably holding the support member proximate a vehicle window sill, the free end downwardly extending over an interior surface of the vehicle, the anchor means comprising a tab member forming a tab loop formed in the support member, the end extremity also being folded within the tab loop to form a cusp loop, thereby forming a cusp-shaped portion of the anchor means, the cusp-shaped portion being formed between the cusp loop and a portion of the flexible support member, the cusp-shaped portion facing along the support member toward the free end thereof for hooking onto a resilient edge extremity of a vehicle member, the support member extending between the vehicle member and a window of the vehicle; [and]

(c) at least one accessory structure[,]; *and*

(*d*) *a fastener element for mounting* the accessory structure [being adjustably mountable] to the support member.

*14. The accessory of claim 1, wherein the accessory structure is mounted on the support member by the fastener.*

*15. The accessory of claim 1, wherein the accessory structure is adjustable mountable on the support member by the fastener.*

*16. The accessory of claim 13, wherein the accessory structure is mounted on the support member by the fastener.*

*17. The accessory of claim 5, wherein the at least one accessory structure is one of a plurality of accessory structures, each of the support members being connectable in spaced relation at horizontally adjustable locations relative to each of the accessory structures.*

* * * * *